United States Patent [19]

Douglas et al.

[11] Patent Number: 4,888,040
[45] Date of Patent: Dec. 19, 1989

[54] NECK RING/PLUNGER ASSEMBLY FOR A GLASSWARE FORMING MACHINE

[75] Inventors: Robert J. Douglas, North Granby; Albert J. Trahan, Veron, both of Conn.

[73] Assignee: Emhart Industries, Inc., Hartford, Conn.

[21] Appl. No.: 329,749

[22] Filed: Mar. 28, 1989

[51] Int. Cl.$^4$ .............................................. C08B 11/00
[52] U.S. Cl. ........................................ 65/307; 65/323; 65/362
[58] Field of Search ................ 65/260, 307, 323, 235, 65/362, 305

[56] References Cited

U.S. PATENT DOCUMENTS

| | | | |
|---|---|---|---|
| 2,994,986 | 8/1961 | Rowe | 65/235 |
| 3,607,206 | 9/1971 | Foster et al. | 65/307 |
| 4,662,928 | 5/1987 | Dauer | 65/307 |

Primary Examiner—Joye L. Woodard

[57] ABSTRACT

An assembly for preventing a flanged finish on the neck portion of a glass container by permitting continuous engagement between the neck ring and the guide ring even though the guide ring is subject to wear and by forcefully maintaining this continuous engagement with a spring urged centering sleeve which extends through a bore in the neck ring to engage the bottom of the guide ring. The neck ring includes a stepped interior annular groove into which a guide ring having an outer stepped annular portion is received. While the total height of the guide ring corresponds to the total height of the groove of the neck ring, the upper surface (70) of the bottom step (72) of the guide ring establishes a selected clearance (Z) with the upper surface (74) of the bottom portion (66) of the neck ring groove so that the continuous engagement can be maintained as the top surface of the guide ring wears.

2 Claims, 1 Drawing Sheet

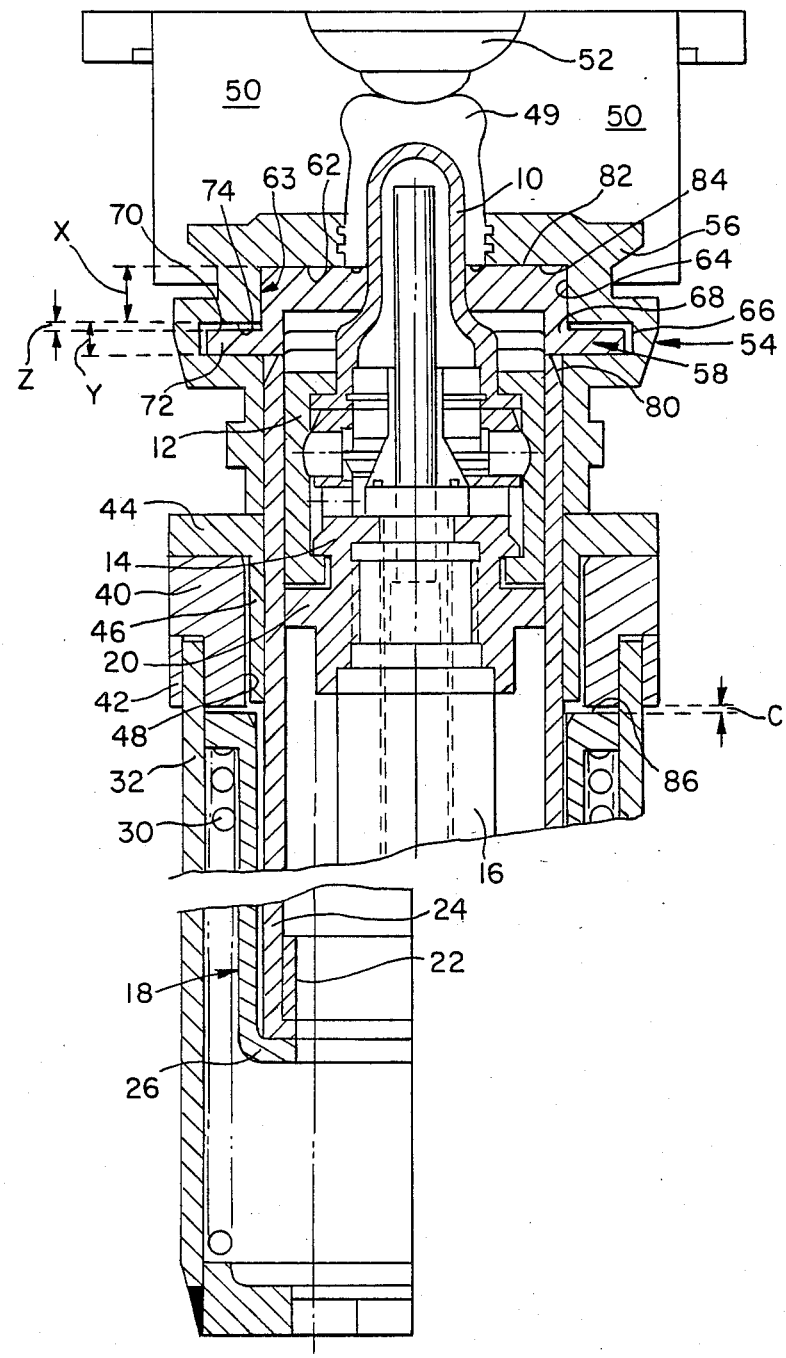

NECK RING/PLUNGER ASSEMBLY FOR A GLASSWARE FORMING MACHINE

BACKGROUND OF THE INVENTION

The present invention relates to individual section glassware forming machines which form containers in the press and blow process, and more particularly, to the neck ring/plunger assembly of such machines which together form the neck portion of a container when a molten gob of glass is pressed into a parison or preform. A neck ring/plunger assembly is disclosed in U.S. Pat. No. 4,272,273.

During parison formation, the outer surface of the neck portion is formed by cooperating neck and guide rings. In use, the guide ring incurs substantial wear, and this wear results in the separation of the neck and guide rings, thereby enabling the formation of a very undesirable flanged finish (a thick annular flange of glass extending outwardly from the neck between these rings which is very susceptible to breakage leaving a sharp surface).

SUMMARY OF THE INVENTION

It is an object of the present invention to provide a neck ring/plunger assembly which will automatically compensate for normal wear to prevent the formation of a flanged finish.

Other objects and advantages of the present invention will become apparent from the following portion of this specification and from the accompanying drawings which illustrate in accordance with the mandate of the patent statutes, a presently preferred embodiment incorporating the principles of the invention.

Referring to the drawing:

The sole FIGURE is an axial cross-sectional view of the neck ring/plunger adapter assembly made in accordance with the teachings of the present invention.

DESCRIPTION OF THE PREFERRED EMBODIMENT

The plunger assembly includes a plunger 10 which is secured to a plunger holder 12, a plunger mounting adapter 14 which is connected to a vertically reciprocating piston 16 and a kickback basket assembly 18. When the piston 16, and hence, the plunger 10 is lowered, the lower surface of the adapter annular support collar 20 engages a spacer 22 which is supported at the bottom of a centering sleeve 24 of the kickback basket assembly 18. Further downward displacement results in the centering sleeve 24 forcing the kickback basket 26 downwardly compressing the kickback spring 30 which is located between the kickback basket 26 and the spring retainer 32. The top of the spring retainer 32 is defined by a plunger assembly cap 40 which is secured to a retainer plate 42. A float cover 44 having a depending central collar 46 is located on top of the cap 40 with the collar 46 being located within the central opening 48 in the cap. A complete description of the plunger assembly is disclosed in U.S. patent application Ser. No. 207,360, filed June 15, 1988, now U.S. Pat. No. 4,836,839.

To form a parison 49, a mold cavity is defined with a pair of opposed side molds 50, an end mold 52 and a pair of opposed neck ring assemblies 54 each having a neck ring 56 and a guide ring 58 for forming the outer surface of the neck portion of the parison 49. Each neck ring 56 has a stepped interior annular groove 62 and a central bore 63. The top portion 64 of this groove 62 (a cylindrical surface) is located at the top defining a top surface 84 and has a first height X and the bottom portion 66 of this groove (an enlarged cylindrical surface) has an annular top surface 74 which extends between these two cylindrical surfaces and has a second height Y. The guide ring 58 has an annular outer stepped portion 68 which is to be received by the stepped groove 62 of the neck ring 56. The guide ring 58 has a cylindrical top portion 64 having a top surface 82 which engages the top surface 84 of the neck ring interior stepped groove and has an enlarged cylindrical portion (bottom step) 72 which is received by the neck ring enlarged cylindrical groove portion 66. While the total height of this guide ring stepped portion 68 corresponds to the total height (X+Y) of the groove 62, the upper surface 70 of the bottom step 72 of the guide ring is defined to establish a selected clearance Z with the top surface 74 of the bottom portion 66 of the neck ring groove.

As illustrated, the upper beveled surface 80 of the centering sleeve 24 is forcefully pushed upwardly against the guide ring 58, thereby forcing the upper surface 82 of the guide ring against the corresponding neck ring surface 84. Since another annular clearance C, at least as large as clearance Z, is defined between the top 86 of the kickback basket 26 and the cap 40, as the top surface 82 of the guide ring wears, the kickback spring 30 will urge the kickback basket 26, and hence, the centering sleeve 24 upwardly. The sleeve 24 will, accordingly, continue to force the guide ring 58 upwardly into engagement with the neck ring 56 until clearance Z is eliminated. By maintaining these surfaces in forceful engagement throughout prolonged machine operation, the formation of a flanged finish, which normally results from the separation of these two surfaces when the upper surface 82 of the guide ring wears, can be prevented.

What is claimed is:

1. A neck ring/plunger assembly for a glassware forming machine comprising:
    a neck ring assembly including a neck ring having a stepped interior groove having a top cylindrical portion with a top surface and a bottom enlarged cylindrical portion and a guide ring having an outer stepped annular portion including a top cylindrical portion to be received by said neck ring top cylindrical portion having a top surface and a bottom enlarged cylindrical portion to be received by said bottom enlarged cylindrical neck ring portion,
    the height of said top cylindrical guide ring portion being selected to be larger than the height of the top cylindrical portion of said neck ring by an amount sufficient so that said top surfaces of said neck and guide rings can be maintained in engagement as the top surface of said guide ring wears, and
    a plunger assembly including means for forcefully urging said guide ring top surface into engagement with said neck ring top surface, the difference between the height of said cylindrical neck and guide ring portions being selected so that the glassware forming machine can be operated for a prolonged period with said surfaces in engagement.

2. A neck ring/plunger assembly according to claim 1, wherein said forcefully urging means of said plunger assembly comprises
    axially displaceable plunger means, centering sleeve means for guiding the axial displacement of said plunger means, said neck ring including a central bore means for receiving said centering sleeve means, said bore means extending from the bottom enlarged cylindrical portion of said stepped annular groove so that said centering sleeve means can engage the bottom enlarged cylindrical portion of said guide ring, and spring means for urging said centering sleeve means upwardly against the bottom enlarged cylindrical portion of said guide ring.

* * * * *